Figure 1:
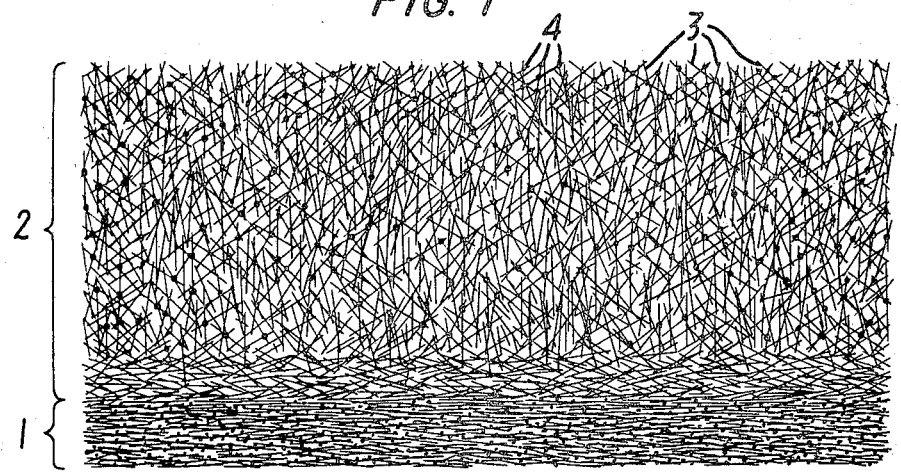

Nov. 21, 1967  D. B. PALL ETAL  3,353,682
FLUID-PERMEABLE FIBROUS MULTILAYER MATERIALS
AND PROCESS OF MAKING THE SAME
Filed Feb. 28, 1966

United States Patent Office 3,353,682
Patented Nov. 21, 1967

3,353,682
FLUID-PERMEABLE FIBROUS MULTILAYER
MATERIALS AND PROCESS OF MAKING
THE SAME
David B. Pall, Roslyn Estates, and Cyril A. Keedwell, Jericho, N.Y., assignors to Pall Corporation, Glen Cove, N.Y., a corporation of New York
Filed Feb. 28, 1966, Ser. No. 530,735
27 Claims. (Cl. 210—505)

This application is a continuation-in-part of Serial No. 98,595, filed Mar. 27, 1961, now U.S. Patent No. 3,238,-056, and of Serial No. 215,151, filed Aug. 6, 1962, now U.S. Patent No. 3,246,767.

This invention relates to microporous fluid-permeable fibrous materials such as filters having at least two integrally associated fibrous layers; and to a process for preparing such materials, characterized by high permeability to fluids, by forming the layers from the same dispersion of fibrous material. One layer has a pore diameter of less than about 25 microns, and an adjacent layer, preferably of the same fibrous material as the first, has pores of larger diameter, and has a proportion of fibers extending outwardly at an angle greater than 30°, with fibers adjacent the first layer interlocked with and bonded to fibers of the first layer, thereby forming an integrated structure.

Filter media can generally be classified as being of one of two types—depth filters and surface filters. A surface filter is one which has pores of substantially the same size and configuration extending from one surface of the filter to the other. Such a filter need not have an appreciable thickness since it removes suspended material from the fluid passed through the filter by collecting such material on its surface, and the material thus removed forms a filter cake or bed upon the filter.

In depth filtration, the filter element is designed to remove contaminants not only on the surface of the element but also as the fluid passes through the element, which has a considerable thickness and which has a plurality of pores of distinct length. The length of the pores increases the dirt capacity, because there is more room for dirt along the pores. Most depth filters are made of masses of fibers or other particulate material, held together by mechanical means or by bonding. One or several layers of such materials can be employed, and these layers can vary in porosity, with the coarsest layer usually arranged to first contact the suspended material, thereby removing from the fluid medium first the coarser and then the finer material as it passes through the filter, thus obtaining some distribution of the contaminants through the filter, and obtaining an extended life as compared to a surface filter.

A most difficult type of filter to manufacture, whether of the surface or depth type, is one having ultrafine or micro pores whose maximum diameter is 25 microns or less, and which has no pores beyond the permissible maximum. Microporous membrane filters have been developed such as, for example, those described in U.S. Patents Nos. 1,421,341 to Zsigmondy; 1,693,890, and 1,720,-670 to Duclaux; 2,783,894 to Dovell et al.; 2,864,777 to Robinson; and 2,944,017 to Cotton. These filters are, however, quite dependent upon the physical properties of the plastic material used in their preparation, are frequently brittle and fragile, especially if pore volume is high, deteriorate rapidly when exposed to temperatures of about 200° to 250° F., and are in any case expensive compared to similar porous media of comparable properties but unduly large pores, such as paper and nonwoven fibrous bats.

In order to overcome their fragility, it has been proposed to lay them down on a paper base, but it is hard to obtain good adhesion between the plastic and the paper, so that the membrane separates or breaks when bent or upon application of an appreciable back pressure differential. For these reasons, plastic membrane composites can be used only in flat sheet, and not in the more efficient pleated filter elements.

Reinforced microporous plastic membranes in which the membrane is laid down on a fabric have been prepared, but since these are not sufficiently self-supporting or rigid, the layers tend to separate when formed into pleated structures.

The available paper filters are economical, but unfortunately do not have ultrafine pores. Paper filters having ultrafine pores of about 2 to 4 microns are manufactured but such products also have a proportion of pores ranging up to 20 microns or more. It is very difficult if not impossible to prepare, at a reasonable cost, papers having both a useful voids volume and substantially no pores more than 10 microns in diameter. This is also true of conventional nonwoven fibrous bats. In addition, such ultrafine pore papers or nonwoven fibrous bats are generally characterized by extremely low fluid permeability, and a high pressure drop, due to a voids volume of between about 20 and 40%, too low for use in many applications, including the filtration of large quantities of viscous fluids.

The permeability of a filter to fluids is a function of pore size and percent voids volume. The higher the percent voids volume, at a given pore size and filter thickness, the larger the flow rate, i.e., the volume of fluid, that can be filtered per unit area and time. In the case of filters having an average pore size of more than 25 microns, a filter medium with as low as 20% voids volume may have adequate permeability. However, in the case of microporous filters, having an average pore size of 25 microns or less, a greatly increased resistance to flow is created as a result of the very small pore size, so that it is essential to have as high a voids volume as possible. For example, a microporous filter having an average pore size of about 1 micron and a voids volume under about 50% is essentially unsatisfactory for many applications since the flow rate will be too slow to be practical. For most applications, microporous filters have been found to require a voids volume in excess of 75% and frequently in excess of 85%.

Thus, a useful microporous filter should have the following attributes:

(1) It should have a microporous structure in which no pore is larger than about 25 microns.

(2) The microporous structure should have a high voids volume, preferably a voids volume of at least 75%.

(3) The product should have a high resistance to compression and back pressure.

(4) The product should withstand as high a temperature as possible. Useful strength at 275° F. is very desirable to permit steam sterilization or hydraulic fluid filtration, both commonly accomplished at this temperature. Useful strength at 400° F. is needed for sterilization by and filtration of hot air.

(5) The product should be insoluble in common chemical solvents and reagents, such as alcohol, acetone, dilute acids, etc.

(6) The product should be as rigid as possible.

(7) The microporous structure should be dimensionally stable, i.e. the pores should not change in size with use.

The latter criterion is quite important since a major application of the microporous filters is in the filtration of microorganisms from fluids. Accordingly, when such sterile microporous filters are in use, a very high concentration of microorganisms exists at the microporous surface. Consequently, any instability of the filter and resultant increase in pore size during use could lead to disastrous consequences.

In this application and in the claims appended hereto, the terms "pore diameter," or "pore size," whether it be maximum pore diameter or size, or average pore diameter or size, is not intended to be a specific physical measurement but rather is a value calculated from the bubble point data as will be hereinafter described.

In copending application Serial No. 98,595, filed March 27, 1961, now U.S. Patent No. 3,238,056, dated March 1, 1966, a method is provided for impregnating or coating or both impregnating and coating a preformed porous substrate with a particulate material in order to yield a microporous product. It has been found that under certain process conditions, coating the porous substrate rather than impregnating it yields a product having a greater permeability to fluids. The microporous coating formed has a very high voids volume, and a very small maximum pore size. The coating tightly adheres to the porous base and hence is stable in use. The microporous medium has sufficient strength and rigidity to withstand normal handling techniques.

In copending application Ser. No. 215,151, filed Aug. 6, 1962, now U.S. Patent No. 3,246,767, a method is proposed for coating a preformed porous base or substrate with a particulate material in order to lay down a microporous layer on the substrate, which layer has a high voids volume, generally at least about 75%, a maximum pore diameter less than about 10 microns, and a proportion of fibers extending outwardly from the base or substrate at an angle greater than about 30°, and which layer is adhered to the substrate by means of a binding agent. The microporous layer tightly adheres to the porous substrate, and hence is stable in use.

In accordance with this invention, a process is provided for manufacturing microporous materials having two layers or zones integrally connected, a first layer which is in effect a substrate but which is formed in situ and is finer in pore diameter than the second layer, which is coarser in pore diameter and is built up on the first layer and locked thereto by intermingled fibers brought together and intertwined during laydown of the first and second layers. The resulting microporous materials are composed of fine and coarse layers integrally associated and bonded together. Unlike the materials of Ser. Nos. 98,595 and 215,151, the substrate or base layer is the finer layer, and the layer built up thereon has a greater thickness than the substrate layer. It thus can take on some of the characteristics of a depth filter.

The process of this invention comprises flowing upon a foraminous support a dispersion in a dispersing liquid of fibrous material, and optionally a binding agent, forming a plurality of clumped masses of fibers together with a proportion of separate fibers in the dispersion, forming on the foraminous support a thin first microporous layer of the separate fibrous material having fibers lying almost entirely in planes approximately parallel to the plane of the layer, and having a maximum pore diameter of less than 25 microns, by flowing through the support not over 20% of the dispersing liquid, at a pressure differential of less than 12 inches of water, depositing the fibers upon the support to form the thin layer and then flowing the supernatent liquid through the thin layer by gravity draining, or by applying a direct pressure to it, or by applying a vacuum to the underside of the foraminous support, and depositing the remaining fibrous material of the dispersion including the clumps on the thin layer, to form thereon a fluid-permeable layer wherein a proportion of fibers extend in a direction outwardly from the thin layer at an angle greater than about 30°, sufficient to impart to the layer an average pore diameter below about 150 microns and a voids volume of at least 75%.

The microporous material can then be stripped from the support, or the support can be allowed to remain, for greater strength, or for fabricating special types of structures.

The process makes possible the production of microporous bilayered fibrous material in the form of mats, bats or sheets of any desired thickness comprising an integrated layered structure having a fine fibrous layer characterized by having fibers lying almost entirely in planes approximately parallel to the plane of the layer, and having ultrafine micropores less than about 25 microns and preferably less than 10 microns in diameter, and a low voids volume, and having a coarser fibrous layer of high voids volume and having pores generally averaging up to about 150 microns in diameter, but preferably not in excess of about 70 microns in diameter, and which can also be made to have rather fine pores, none of which exceeds 25 microns in diameter. The relatively coarse layer is characterized by having a proportion of fibers extending outwardly from the fine layer at an angle greater than about 30°, and by a wide spacing of fibers in the layer, which is responsible for the high voids volume, as compared to the fine layer. The voids volume of this relatively coarse layer preferably exceeds about 75%, and is frequently greater than 85%.

The fiber spacing and angular disposition of the fibers in the coarse layer is noted by cross-sectional examination, upon sufficient magnification through an optical or electron microscope. This unique property of the relatively coarse layer is in large measure responsible for the combination of high voids volume and low pore size characteristic of the products of this invention, whereas the thin layer has a low voids volume and an even lower pore size because the fibers are approximately in the same plane.

Where the multilayer microporous material of the invention is employed to remove bacteria and other microorganisms from a fluid, the fine layer should have a pore diameter within the range from about 0.03 to about 0.8 micron, and the coarse layer should have a pore diameter within the range from about 0.07 to about 2.5 microns.

Filter units and elements comprising the microporous material of this invention are capable of absolutely removing from fluids particles as small as 25 microns in size, and even particles of from 10 microns down to 0.03 micron and smaller. At the same time, a layer is provided that protects the fine filtering portion of the filter from clogging by particles coarser than 0.07 up to 150 microns, thus serving as a type of depth filter.

The microporous material of integrated multilayer structure of the invention preferably comprises a fine layer having a thickness within the range from about 0.0001 to about 0.05 inch, and preferably within the range from about 0.0005 to about 0.01 inch. When employed to remove bacteria and other microorganisms from a fluid, the thickness preferably is within the range from about 0.0002 to about 0.002 inch. The fine layer, since it has a low voids volume, has a low porosity, and therefore a low flow capacity. Hence, it should be as thin as possible. However, the coarser layer has a high voids volume, and has therefore no critical thickness limit. Thus, the coarser layer has a thickness that depends upon the requirements for depth type filtration in the environment of use. It can accordingly range upwards from about 0.002 inch in thickness to one or several inches in thickness. Usually, however, it will have a thickness of from about 0.003 to about 0.5 inch.

FIGURE 1 represents a cross-sectional view through an integrated multilayer microporous material of the invention, showing the fibers of the fine layer extending in the plane of the layer, and the fibers of the coarse layer extending at an angle greater than about 30° and the high voids volume there, due to the wide spacing of the fibers.

This figure represents the product produced in accordance with Example 1 and a detailed description thereof will be found in that example.

Figure 2:
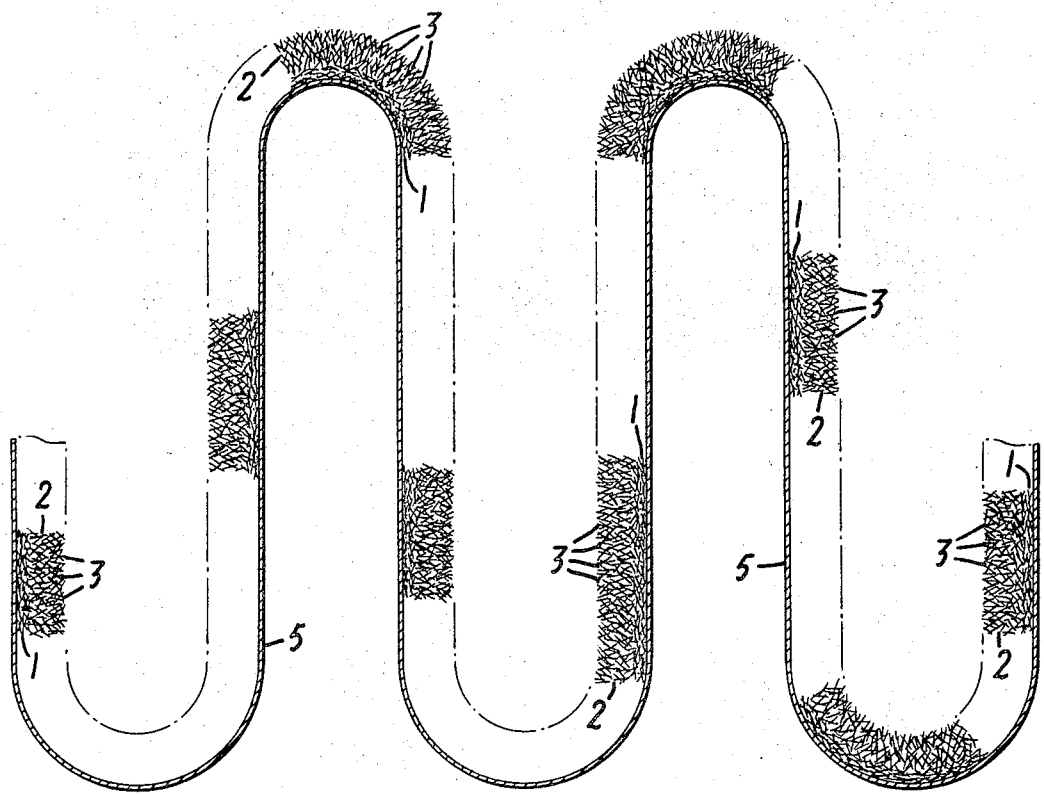

FIGURE 2 is an enlarged cross-section view, with portions broken away, of a filter of the invention in corrugated form.

The invention is of particular application to the preparation of microporous materials formed in pleats, convolutions, or corrugations. In such cases, the microporous material, with or without a support, can be corrugated, convoluted or pleated using conventional methods. Also, the porous base on which microporous material is built up can be formed in pleats, convolutions or corrugations, and the microporous layers can by this process be laid on the base without bridging between adjacent pleats, convolutions or corrugations, and no shrinkage of the microporous layers occurs in use.

FORMATION OF THE DISPERSION

In the process of the invention, as indicated, fibrous material is dispersed in a liquid and deposited therefrom upon the surface of a foraminous support base. The desired degree of microporosity of the deposited layers is obtained by varying the type, size and amount of the fibers deposited, by employing blends of different sizes of fibers, if desired, and by carefully controlling the state of dispersion of the fibers. Dispersions which are heavily flocculated tend to form layers of high voids volume, but with poor uniformity of pore size and poor integration. Dispersions which are well deflocculated (peptized dispersions) tend to form layers of low voids volume, and hence of low permeability. The degree of flocculation yielding the desired uniformity, adhesion, and voids volume is determined for each dispersed system, using the test described herein.

The product of the invention can be formed of fibrous material of any type, the only requirement being that the material be capable of being dispersed in a liquid and preferably have a diameter less than about 25 microns and a length preferably not exceeding about 3500 microns. The ratio of diameter/length is from about 50 to about 5000, and preferably from about 350 to 5000.

Fibrous material is preferred, because of its versatility, greater ease of deposition, and greater strength imparting properties, and because fibers can be oriented by liquid flow or absence of liquid flow so as to be deposited in any desired position or angle in the layers. A great variety of diameters of fibers are available, thus making it possible to achieve a very large assortment of mixtures of different diameter fibers for making fibrous material of any porosity, and such fibers can be made of any length, within the stated range, so as to take advantage of the greater cohesiveness of a layer of long fibers, as compared to granular material layers. Typical fibrous materials include glass and quartz, asbestos, potassium titanate, colloidal aluminum oxide ("Baymal"), aluminum silicate, mineral wool, regenerated cellulose, microcrystalline cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, metallic fibers such as iron, copper, aluminum, stainless steel, brass, Monel, silver and titanium, and clays with acicular lath-like or needle-like particles, such as the montmorillonite, sepiolite, palygorskite, and attapulgite clays of this type.

The layers can be advantageously modified by employing a mixture of long and short fibers. The long fibers can be of an average length not less than the average pore size of the foramina of the support or mesh screen, and form the first thin layer thereon. Thereafter, a substantially uniform layer of long and short fibers can be laid down on the first layer. Such a mixture of fibrous material should comprise from about ½ to about 30%, and preferably from about 2 to about 15%, by weight of long fibers having an average length as great as the average pore size of the foramina of the coarse support substrate or mesh screen. The diameter of the long fibers should be less than about 10 times the diameter of the small fibers which comprise the rest of the mixture, and should preferably be less than about 3 times the diameter of the small fibers. Employment of more than 30% by weight of long fibers in the fibrous material mixture affords no significant advtanges, but will only provide a coarser filter medium.

The fibrous material employed in the mixture of various size fibers if it is too long, or agglomerated, can be broken down into such a length that the desired pore size can be formed. Thus, for example, if the fibers are supplied in bundles which are not readily dispersible in water, the bundles should be broken up by a high shearing action or by grinding, so that the ratio of the length of the fiber to the diameter of the fibers is within the range from about 50 to 5000, and preferably within the range from about 350 to about 5000. Such fibers can be broken up with the use of conventional mechanical equipment, such as high speed propellers, and grinding equipment, such as Jordan beaters. Thus, for example, if bundles of asbestos are to be used as fibrous filter material, the bundles can be broken down by the use of grinding equipment, such as Jordan beaters, or by ball milling in a nonionic detergent-water solution to break down and segregate the fibers from one another. Oversized asbestos can be removed from such a mixture by the use of liquid cyclones, such as hydroclones, which collect the desired short fiber material, free of the oversized material. Where asbestos is employed, the use of high speed propellers to generate high shearing action has ben found to be inadequate to break up the bundles of fibers. However, where asbestos is used as the long fiber containing material, grinding or shearing action, using a propeller such as Cowles dissolver, can be employed since a small number of fibers having a diameter to length greater than 5000 can be tolerated.

A mixture of long and short fiber-containing filter material is also employed in the filter material where special properties are to be imparted to the filter medium such as, for example, good dirt capacity, good flow-through and high filtering power, good mechanical strength, and the like.

Nonfibrous particulate materials can be used in admixture with fibrous materals. However, in order to achieve the requisite microporosity and voids volume, it is essential to employ at least one part by weight of fibrous material for every three parts of nonfibrous materials. When nonfibrous particles are employed, they should have an average diameter not exceeding 25 microns. Those nonfibrous materials containing a fine internal structure or porosity are preferred.

Typical nonfibrous particulate materials are diatomaceous earth, magnesia, silica, talc, silica gel, alumina, quartz, carbon, activated carbon, clays, synthetic resins and cellulose derivatives, such as polyethylene, polyvinyl chloride, polystyrene, polypropylene, ureaformaldehyde, phenolformaldehyde, polytetrafluoroethylene, polytrifluorochlorochloroethylene, polymers of terephthalic acid and ethylene glycol, polyacrylonitrile, ethyl cellulose, polyamides, and cellulose acetate-propionate, and metal particles such as aluminum, silver, platinum, iron, copper, nickel, chromium and titanium and metal alloys of all kinds, such as Monel, brass, stainless steel, bronze, Inconel, cupronickel, Hastelloy, beryllium, and copper.

The liquid medium used for the dispersion is preferably inert to the fibrous material, and a nonsolvent for any binder that is used. It should not dissolve a substantial amount of either, although if the liquid is reused, the fact that some material is in solution is not a disadvantage, since a saturated solution is quickly formed ab initio. The liquid should be volatile at a reasonably elevated temperature below the melting point of the material to facilitate removal after the dispersion is deposited. However, nonvolatile liquids may be desirable under certain conditions, and those can be removed, by washing out with a volatile solvent that is a solvent for the liquid but not for the fibrous material. The liquid can be the liquid to be filtered by the final product.

Typical liquids are water, alcohols, polyalkylene glycols, such as polyethylene, glycols, poly 1,2-propylene glycols, and mono and di alkyl ethers thereof, such as the methyl, ethyl, butyl and propyl mono and di ethers, dialkyl esters of aliphatic dicarboxylic acids, such as, di-2-ethylhexyl adipate and glutarate, mineral lubricating oils, hydraulic fluids, vegetable oils and hydrocarbon solvents such as xylene and petroleum ether, silicon fluids, chlorobromo and fluoro hydrocarbons, such as the Freons. Since the final product is permeable to any liquid, depending upon the choice of fibrous material, obviously a wide selection of liquids is available, and such would be known to one skilled in this art.

The characteristics of the deposited layers desired are determined by control of several variables.

One factor is the size of the fibrous material. This can be so chosen as to be larger than, equal to, or smaller than the pore diameter.

The degree of flocculation is important with respect to the voids volume, uniformity, and adhesive characteristics. The characteristics of the fine layer are determined by the characteristics of the fibers that are deflocculated and separated from the clumps by any conventional means, such as mechanicaly, electrically, or chemically. The characteristics of the coarse layer are determined by the characteristics of the flocculated fibers that are deposited only after the fine layer has been formed. It is believed that when the degree of flocculation is within the optimum range, a plurality of fibers in the dispersion form clumps which are relatively nongravity settling, in which the fibers tend to adhere to each other when they first touch each other, and to retain the random orientation thus acquired. The clumps then, rather than the individual fibers, are deposited on the first layer, and build up the coarse layer thereon. There can also be a proportion of fibers at an angle greater than 30°, because they take this position in the dispersed clumps, and retain it after deposition because they are so supported by the other fibers. Since the fibers are joined to other fibers while still dispersed, they tend to be joined at a wider spacing than they otherwise would, thereby contributing to the unusually high voids volume of the coarse layer. The extent of the need for flocculating and deflocculating agents (which are not required if the dispersion is sufficiently flocculating without them), for pH control, and for controlled agitation, to achieve the optimum state of flocculation for each fibrous material must be determined experimentally, by adding flocculating and deflocculating agents to the dispersion and varying the state of agitation and the pH of the dispersion, using the test described herein.

It may be advantageous to use a blend of small and large fibers to assist in establishing interlocking between the fine layer and the coarse layer. There is a transition zone between the fine layer and the coarse layer, made up of fibers of both layers laid down at intermediate angles and positions.

As has been stated, it is essential that the fibers of the fine layer and coarse layer be held securely to one another by interlocking and not be easily dislodged by reverse pressure or mechanical abrasion subsequent to application.

In order to obtain strong adhesion between the fibers where the product is desired to withstand reverse flow, and mechanical abrasion, the dispersion of fibrous materials can include a binding agent or heat- or solvent-sensitive fibers or particulate material. Alternatively, if desired, or in addition, a binding agent can be impregnated into the microporous material after it has been formed. Then the binder or heat- or solvent-sensitive material is activated to bind the fibers together.

The fibrous and/or nonfibrous particulate materials in the dispersion should be capable of being wetted by the binding agent employed and of remaining wetted thereby even in the presence of the dispersing liquid. This latter requirement can be generally insured by premixing the binding agent and the fibrous material before adding them to the dispersing liquid.

The binding agent employed in the instant invention can be a liquid, or a solid capable of being softened or liquefied at the time adhesion is to be effected, and if a liquid, thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol-formaldehyde resins, urea-formaldehyde resins, melamine-formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic or heterocyclic, and may be substituted if desired with substituents, such as chlorine atoms, hydroxyl groups, ether radicals, and the like. They may also be monomeric or polymeric.

If the polyepoxide material consists of a single compound and all of the epoxy groups are intact, the epoxy equivalency will be integers, such as 2,3,4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric materials may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the mono-acetate of epoxidized glycerol dioleate, 1,4-bis(2,3-epoxypropoxy) benzene, 1,3 - bis(2,3 - epoxypropoxy)benzene, 4,4'-bis 2,3 - epoxypropoxy)diphenyl ether, 1,8 - bis(2,3 - epoxypropoxy)octane, 1,4 - bis(2,3-epoxypropoxy)cyclohexane, 4,4' - bis(2 - hydroxy - 3,4 - epoxybutoxy)diphenyldimethylmethane, 1,3 - bis(4,5 - epoxypentoxy) - 5 - chlorobenzene, 1,4 - bis(3,4 - epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2 - bis(4 - hydroxyphenyl) propane (Bisphenol A), 2,2 - bis(4 - hydroxy-phenol) butane, 4,4' - dihydroxybenzophenone, bis(4 - hydroxyphenyl)ethane, 2,2 - bis(4 - hydroxy-phenyl)pentane, and 1,5-dihydroxynaphthalene. The halogen-containing epoxides may be further exemplified by 3 - chloro-1,2- epoxybutane, 3 - bromo - 1,2 - epoxyhexane, 3 - chloro-1,2-epoxyoctane, and the like.

The monomer products produced by this method from dihydric phenols and epichlorohydrin may be represented by the general formula:

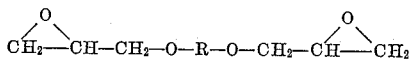

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol, $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The preferred glycidyl polyethers of the dihydric phenols may be prepared by reacting the required proportions of the dihydric phenol, such as Bisphenol A, and the epichlorohydrin in an alkaline medium. The desired alkalinity is obtained by adding a basic substance, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Any known type of curing agent can be employed in conjunction with the polyepoxide resins employed in this invention. For example, organic amines and quaternary ammonium compounds as in Patent No. 2,506,486, acidic organic orthophosphates as in Patent No. 2,541,027, sulfonic acid or sulfonyl halides as in Patent No. 2,643,243, and acid anhydrides either alone or with activators as in Patent No. 2,768,153. The organic amines are particularly preferred since they give the fastest rate of solidification. Aliphatic amines such as dimethylamine, trimethylamine, triethylamine, 1,3-diaminopropane, hexamethylene diamine, diethylene triamine, triethylene tetramine, octylamine, decylamine, dioctylamine, and dodecylamine are exemplary of primary, secondary and tertiary aliphatic amines. The aliphatic amines preferably have from one to twelve carbon atoms. Also useful are the aromatic amines such as phenylene diamine, di(methylaminomethyl)phenol, tri(dimethylaminomethyl)phenol, and diethylaniline.

The acid anhydrides are also quite useful as curing agents. These compounds are derived from mono or preferably, polycarboxylic acids, and possess at least one anhydride group:

Z represents the carboxylic acid residue, and may be a saturated or unsaturated aliphatic, cycloaliphatic, aromatic or heterocyclic group. Exemplary are phthalic anhydride, maleic anhydride, "Nadic" methyl anhydride, succinic anhydride, chlorosuccinic anhydride, 6-ethyl-4-cyclohexadiene-1,2-dicarboxylic acid anhydride, dodecenyl succinic acid anhydride, tetrahydrophthalic acid anhydride, pyromellitic dianhydride, and the like. Other anhydrides which can be used will be found mentioned in U.S. Patent No. 2,768,153.

Also applicable as binding agents for use in this invention are solutions of solid thermosetting resins in suitable solvents.

Thermoplastic solid binders can also be employed as long as they can be softened to a tacky state, or liquefied, as by heating to above their softening point, to effect adhesion. Such thermoplastic materials can be employed alone or in solution in a suitable solvent. Typical thermoplastic binders include polyethylene, polypropylene, polymethylene, polyisobutylene, polyamides, cellulose acetate, ethyl cellulose, copolymers of vinyl chloride and vinyl acetate, polyvinyl chloride, polyvinylidene chloride, polyvinylidene fluoride, polyvinyl butyral, polytetrafluoroethylene, polytrifluorochloroethylene, lignin-sulfonate resins, starch binders, casein binders, and terpene resins, polyacrylic resins, such as polymethyl methacrylate, and alkyd resin.

In addition, there can be used elastomeric binders such as a natural or synthetic rubber. A preferred synthetic rubber which can be employed is neoprene which is a polymer of 2-chloro-butadiene-1,3, generally referred to as polychloroprene. These can be used in the practice of this invention in the form of the conventional latices of polymers of chloroprene. These are prepared by polymerization of chloroprene in aqueous emulsion by well-known techniques which are disclosed in numerous references, such as, for example, Whitby, "Synthetic Rubber," 1954, pages 767 to 793, and the following U.S. patents: 2,264,173; 2,417,034; 2,426,854; 2,463,225; 2,467,769; 2,494,087; 2,567,117; and 2,576,009. The solids content of the polychloroprene latices usually ranges from 30% to about 60%.

It is to be understood that the term "chloroprene polymer" is intended to include both homopolymers of chloroprenes and copolymers of chlorprene in which the copolymer contains another copolymerizable monomer containing the group

Examples of suitable comonomers include: vinyl-substituted aromatic compounds such as styrene, vinyltoluenes, and vinylnaphthalenes; acrylic and methacrylic acid esters and nitriles, such as methacrylate and acrylonitrile, and compounds containing two conjugated double bonds such as 1,3-butadiene, isoprene, and 2,3-dichloro-1,3-butadiene.

Other synthetic rubbers useful herein include, for example, the product known as GR-S (SBR) which are copolymers of butadiene and styrene containing about 50% to about 70% by weight butadiene; the rubber designated as Buna N, or Hycar (NBR), which are copolymers of butadiene and acrylonitriles containing about 50% to about 80% by weight butadiene; the homopolymers of butadiene (BR) as well as the homopolymers and/or copolymers of butadiene homologues such as the isoprene rubbers (IR). These materials are generally designated as synthetic rubbers, and more specifically designated as rubber-like polymers of butadiene, isoprene and chloroprene, and rubber-like copolymers of butadinene or isoprene with copolymerizable vinyl compounds such as styrene and acrylonitrile. In addition, ethylenepropylene rubbers and polyurethanes can be employed.

In preparing the dispersion of fibrous material, the binding agent can be mixed with the fibrous material and the mixture then added to the dispersing liquid with agitation, to create a stable dispersion. When the fibrous material is prewetted with the binding agent in this manner, the droplet size of the final dispersion is coarser than when the fibrous material and the binding agent are added separately to the dispersing fluid. To stabilize this coarser dispersion, it is preferred that the dispersion have a viscosity in excess of about 400 centipoises at 25° C. If the particulate dispersing fluid does not have a sufficiently high viscosity to achieve this, the viscosity of the dispersion can be increased by the addition of any of the well known soluble high molecular weight materials which have the ability to substantially increase the viscosity of fluids even when present in very small quantities. Soluble cellulose derivatives are particularly useful when the dispersing liquid is water. The addition to water of less than 2% by weight of soluble, high molecular weight hydroxyethyl cellulose, soluble sodium carboxymethyl cellulose or soluble hydroxypropyl methyl cellulose, for example, has the effect of raising the viscosity of the water to well above the specified minimum even in the absence of the fibrous material and the binder.

An alternative method of preparing the dispersion which can be used to ensure that of fibrous material will be sufficiently wetted by the binding agent involves the use of a binding agent dissolved in a suitable solvent. The binding agent is insoluble in the dispersing liquid while the solvent is at least partially soluble therein. The fibrous material and the binding agent solution, which can be premixed if desired, either in whole or in part, are added to the dispersing liquid. The solvent dissolves wholly or partially in the dispersing liquid, causing the precipitation of the binding agent on the fibrous material. The viscosity of the liquid dispersion can be sufficient to prevent more of the binding agent or fibrous material from settling out than is desired to form the fine or base layer of the microporous material.

The binding agent can also be used as an aqueous dispersion or latex, which is mixed with the aqueous fibrous dispersion. The binder then can be precipitated on the fibers by addition of a precipitating agent or coagulating agent.

For example, the elastomeric or other binder material also can be dispersed or dissolved in an organic solvent. Such a dispersion can be mixed with the dispersion of fibrous materials. The organic solvent should be partially miscible with the dispersing liquid for the fibrous material. The organic solvent should have a solubility in the dispersing liquid for the fibrous material of at least about 0.5 g. and not greater that about 15 g. per 100 g. of dispersing liquid, and preferably within the range from about 0.7 to about 8 g. per 100 g. If the organic solvent is more soluble in the dispersing liquid than this, the particles of binding agent dispersed in the organic solvent tend to precipitate from the solvent in the form of solid particles, and will not stick to the fibrous material. On the other hand, where an organic solvent is employed which is completely immiscible with the dispersing liquid for the fibrous material, an emulsion of the binder dispersion and the dispersion of the fibrous material will be formed, with the result that the elastomeric binder will not stick to the fibrous material. Moreover, where an organic solvent is employed which is partially miscible with the dispersing agent for the fibrous material as indicated above, when the binder dispersion is mixed with the dispersion of fibrous filter material, the binding agent will be in the form of a viscous gummy or tacky solid. The viscosity of the binder dispersion, however, should in no event be greater than 500 cps.

Examples of organic solvents suitable for use herein where the dispersing liquid for the fibrous material is water, include, but are not limited to, amyl acetate, butyl acetate, ethyl acetate, propyl acetate, isopropyl acetate, isobutyl acetate, butyl Cellosolve acetate, butyl carbitol acetate, ethyl acetoacetate, isopropenyl acetate, butyl lactate and various ketones including methyl propyl ketone, methyl isobutyl ketone, methyl isoamyl ketone, and the like. Each of these organic solvents has a solubility in water within the specified range set forth above.

Where flammability of the organic solvents and the dispersing liquids employed is a problem, chlorinated hydrocarbon solvents such as carbon tetrachloride, trichloroethylene, dichloroethylene, perchloroethylene, and the like can be employed as an organic solvent for the binder. However, such noninflammable organic solvents are immiscible with water, and thus if water is used as the dispersing liquid for the fibrous material, the resulting binder dispersion will have too low a viscosity for adhesion to the fibers. Accordingly, a solvent which is miscible with water (the dispersing liquid for the fibrous material) can be added to the water-immiscible binder agent mixture to increase the viscosity of the dispersion.

Any known type of curing agent can be employed in conjunction with the elastomeric binding agent employed in this invention, such as, e.g., metallic oxides such as zinc oxide and magnesium oxide, zinc salts of 2-mercapto-benzo-thiazole, and zinc dibutyl dithiocarbamate.

The above elestomeric binding agents also can be mixed with an aqueous dispersion of fibrous material and a precipitating agent to facilitate the deposition of the elastomeric binder on the fibrous material. Such precipitating agents are well known in the art and include magnesium chloride, hydrated aluminum sulfate, aluminum nitrate, various calcium salts, and the like. Some flocculating agents also serve the function of precipitating agents.

The dispersion should preferably contain from about 0.1 to 5 parts by weight of fibrous material per 100 parts by weight of dispersing liquid and, if a binder is present, from 1.5 to 2000 parts by weight of binding agent per 100 parts by weight of fibrous material, preferably at least about 10 parts of binding agent per 100 parts of fibrous material.

The pore size and voids volume of any microporous layer is determined by the fiber length and diameter and the state of suspension of the fibers in the dispersion. The state of suspension required for forming a layer of the desired pore size and voids volume for a given fiber or fiber mixture is determined by trial and error, and the parameters required to duplicate the successful experiment determined by a few simple measurements.

The state of suspension of the dispersion determined to be desirable is measured by the degree of flocculation thereof by titration with a solution capable of flocculating the dispersion such as magnesium sulfate or aluminum sulfate solution, for fiber dispersions having a pH above about 7, or sodium carbonate or sodium hydroxide solution for fiber dispersions having a pH below 7. The fiber dispersion in the test solution suitably can have a fiber concentration of 1 g./l., and the titrating solution a concentration of 5% of the active agent. The extent of flocculation effected by this flocculant is measured by observation of the turbidity of the dispersion, such as by a colorimeter, during the titration. A dispersion of this turbidity is then known to have the correct flocculating properties, or state of suspension, and succeeding dispersions can be made to this turbidity. Any desired flocculating property can be prepared by addition of the appropriate amount of dispersant or flocculating agent, to make the dispersion more or less flocculating, as the amount of titrating solution in the test may indicate, to give the required turbidity.

In order to make the dispersion less flocculating, a dispersing agent can be added to either or both of the dispersions although this is not essential. Any dispersing agent known to disperse the fibrous material used can be employed. These can be of the type used in the papermaking trade, such as the alkali metal polyphosphates, for example, sodium hexametaphosphate, sodium pyrophosphate, and sodium metasilicate, pentasodium tripolyphosphate, and sodium metaphosphate, as well as any synthetic surfactant or organic emulsifier, such as are described in Schwartz and Perry, "Surface Active Agents."

In order to make a dispersion more flocculating, a flocculating agent can be added. This can be of the type used in the paper-making trade.

Exemplary dispersing and flocculating conditions for several common fibers are as follows:

CONDITIONS

| Fiber | For Dispersion | For Flocculation |
|---|---|---|
| Amosite type amphibole asbestos. | Add Tamol 850 (a water soluble sodium salt of polyacrylic acid) or a nonionic wetting agent. | Add an excess of sodium carbonate. |
| Crocidolite type amphibole asbestos. | Add Tamol 850 or a nonionic wetting agent. | Do. |
| Chrysotile asbestos | Add Tamol 850 or sodium hexametaphosphate. | Do. |
| Glass | Maintain pH at about 3. | Increase or decrease pH from 3. |
| Potassium titanate | Add a dispersing agent prepared by mixing 53.4 parts of mixed ammonium and ethanolamine salts of alkyl sulfuric acids derived by sulfation of the alcohols obtained by reducing coconut oil, 15 parts of the monoalkylolamide of coconut oil fatty acids and monoethanolamine, 2 parts of electrolyte (chloride and sulfate of monoethanolamine), 24 parts of ethanol and 5 parts of water. | No special conditions needed. |

The flocculating agent can be added to the dispersion after the desired amount of material has been applied to the foraminous support during laydown, to effect deposition of the remaining supernatant fibers. In a case of this type, it is preferred that the slurry be on the verge of instability and deposition, so that flocculation and deposition promptly follows blending with even small amounts of flocculating agent.

Some fibrous materials tend to flocculate others, due to, for example, a difference in charge on the fibers. For example, potassium titanate fibers are flocculants for asbestos fibers. Addition of the former to the latter therefore results in flocculation.

The amount and location of fibers deposited at any stage can be controlled by control of deposition through a varying of the size of fibrous material introduced, or by the amount of agitation applied to the slurry during deposition.

A dispersion which tends to flocculate in a quiescent suspension can be dispersed by agitation. The fibers are deflocculated during agitation but after agitation ceases, flocculation can recur. Thus, the characteristics of the layers laid down can be modified by agitation.

The amount of dispersing agent and flocculating agent, if used, should be selected with care, since if too much dispersant is used, the fibrous material will pass right through the formaminous layer, and clumping may be inhibited, whereas if too much of the flocculating agent is used, deflocculation is inhibited, and the fibrous material will not form a suitable thin layer. However, the relative amounts are readily determined by trial and error in each case, in relation to the fibers, their size, the temperature of deposition, the hardness of the water, and the solids content of the dispersion. Usually, from 0.001 to 5% of dispersant and from 0.001 to 5% of flocculant are satisfactory. These can be used separately as described, or together in the slurry in amounts to give a dispersion until deposition.

A wetting agent which wets the material can also be incorporated in the dispersion. If a dispersing agent is used, this should also serve as a wetting agent for the fibers and therefore should not only disperse the fibrous material but should also wet the fibrous material. If no dispersing agent is used, a wetting agent may be desirable. Potassium titanate, for example, does not always require a dispersing agent to form a sufficiently stable slurry in water, but a wetting agent may be required to obtain adhesion between certain fibers, such as glass, wool and synthetic resins.

From 0.001 to 5% of a wetting agent is usually sufficient. Anionic, nonionic and cationic wetting agents can be used.

LAYDOWN OF THE DISPERSION

Any method of applying the dispersion to the foraminous support in a manner to permit an initial layer formation followed by a draining of the supernatant liquid through the first layer and the support can be used. The dispersion can be flowed upon the support, such as a Fourdrinier wire mesh, or a porous smooth paper, or perforated metal band, if a smooth surfaced highly microporous material is desired, and deflocculated to form the initial fine layer. Some liquid may pass through the support at this stage, and aid in forming the initial layer by the liquid flow thus created. Thereafter, the supernatant dispersion can be drained through by gravity, or by a differential pressure applied for this purpose by applying a direct pressure to it or by applying a vacuum to the underside of the support. The dispersing liquid is thus drawn through the fine layer, and the fibrous material deposited thereon.

Any porous material whose pores extend from surface to surface can be used as the foraminous support upon which the microporous layers are built up by deposition. The nature of the support will to some extent depend upon whether it is to be a part of the final microporous material, or whether it is to be stripped therefrom after formation. If it is to be a part of the material, one or several layers of the same or varying porosity can be employed. These can be composed of cellulose or other fibers. A smooth-surface material should be used if the support is to be stripped off, and a smooth fine layer is desired. Paper, which can, if desired, be resin impregnated, is a preferred base material since it yields an effective, versatile and inexpensive microporous fluid-permeable medium. Where desired, other foraminous support materials can be used, such as porous sintered powders or forms of metals and of natural or synthetic plastic materials, such as aluminum, and synthetic resins and cellulose derivatives, in the form of spongy layers of any desired thickness, such as polyurethane (see Patent No. 2,961,710), polyvinyl chloride, polyethylene and polypropylene sponges and foams, woven wire products, sintered or unsintered, textile fabrics and woven and nonwoven fibrous layers of all kinds, such as felts, mats and bats, made of fibrous materials of any of the types listed hereinbefore in connection with the fibrous material. When it is to be a part of the microporous material, the foraminous support material will normally have an average pore diameter of not less than about 2.5 microns. Such materials can of course have pores as large as 20 to 25 microns, or more. The pore size of the support is not critical, however, inasmuch as the fine and coarse layers will normally have smaller pores, and will be responsible for the removal of the smallest particles. The support will serve a filtering function only if the flow is from that direction and the thin layer then assumes primary responsibility for removal of the smallest particles.

Where a Fourdrinier or similar traveling mesh belt type paper-making machine is employed in carrying out the process of the invention, the dispersion of fibrous material, binding agent, dispersing liquid and flocculating or deflocculating agents as needed, is deposited from the head box onto the continuously traveling mesh belt. The dispersion is deflocculated due to the movement of the liquid, and the deflocculated fibers deposit on the belt to form an initial thin layer having the desired thickness, set forth hereinbefore, and which is substantially free of flocs. This usually requires at least 15 seconds, and preferably at least 30 seconds. When turbulence in the dispersing liquid is reduced, due to restriction of drainage, after formation of the thin layer, the fibers reflocculate, and form clumps. The belt then can be passed under a doctor blade to break up excessively large flocs in the supernatant dispersion. If desired, it can be passed over the vacuum or suction boxes, to draw the dispersing liquid through the support, or the liquid can be allowed to drain through, thereby depositing and forming a relatively coarse layer of the fibrous material on top of the initial thin layer, which coarse layer has the desired characteristics set out hereinbefore.

It is the difference between deposition of a deflocculated dispersion and deposition of a flocculated dispersion that spells the difference between the two types of layers making up the microporous materials of the invention. Deflocculated separate fibers align themselves in the same plane as the foraminous support or other base upon which the material is being laid down. By judicious flocculation of the remaining dispersed fibers, forcing them into clumps, the fibers thereafter deposited upon the support assume an angle to the plane of the support that for a proportion of the fibers is 30° or more. The directional flow of the liquid also induces an intermingling of the later-deposited fibers with the previously deposited fibers. After all of the dispersing liquid has been drawn off, the deposited fibers are brought closer together, and the density of the microporous material is increased, at the same time increasing the degree of interlocking and intermingling of fibers in each layer. The result is a multilayer material in which the layers are firmly interlocked. In this respect, the materials of the invention differ from multilayered materials in which the fibers are all laid down by the same procedure, i.e., by gravity settling exclusively, or by pressure-flow-through exclusively, and the materials also differ from mutilayered materials in which the various layers are formed separately, and then brought together and bonded as discrete layers.

The compression and hence bulk density of the layers deposited can be varied by varying the differential pressure across the layer during deposition. The differential pressure is in turn dependent upon fluid velocity and viscosity, and the permeability of the fine layer. For a given differential pressure, the layer density can be decreased by including a small amount of bulked or crimped coarse fibers which can support the finer fibers and space them better.

Under certain circumstances, it is desirable that shrinkage during drying of the layers be minimized, for example, to prevent the fibers from pulling away from each other. Shrinkage can be minimized by applying the dispersions in several applications, for example, in from two to six applications, while removing the material from the suspension between each application, and applying a differential pressure of up to about 100 p.s.i. Greater pressures are preferably avoided before solidification of the binding agent in order to prevent any possible reorientation of the angularly oriented fibers. The liquid binding agent, if any, contained in the coating dispersion can, if desired, be caused to solidify between the several applications of the dispersion. Alternatively, solidification can be effected after complete application.

When fibers are deposited on a foraminous support, tortuous passages of varying sizes exist between the fibers. These passages in the aggregate have a mean pore size which determines the effective diameter of the layer, and which depends on:

(1) The dimensions (diameter or diameter and length) of the fibers (2) The shape of the fibers (3) Internal structure (as for example, when diatomite particles are used)

(4) The average distance between adjacent fibers (5) The state of aggregation and uniformity of spacing of the fibers.

Fine and coarse fibers may be combined and blended to produce a layer having an intermediate mean pore diameter dependent on the proportions of the particles. Different sizes of fibers can be deposited in different regions of the layer, thus producing a gradation in pore size.

A binding agent can be and preferably is used in conjunction with each layer. The binding agent can be flowed through the layers as a final operation, or any of the binding agents mentioned above can be added to the dispersion before it is applied to the base. The binding agent can also be incorporated in the layers after deposition, if it has a deleterious effect upon the dispersion. It can for example be washed through the layers after the fluid has been drawn off, or it can be deposited on the surface of the layers, whence it will spread by capillarity throughout all the layers.

After the deposition has been completed, adhesion of the individual fibers to one another is effected. The conditions necessary to accomplish this vary with the nature of the binding agent and for heat-or solvent-activatable fibers and for particulate material. For example, the temperature can be raised to a point high enough to cause the cross-linking or polymerization thereof, or to cause the evaporation of the solvent. Alternatively, in the case of a thermoplastic material, the temperature can be increased to effect softening or fusion, or sintering or brazing. A catalyzed resin can be allowed to stand at room temperature until the resin is set.

If it is necessary to raise the temperature of the product to cure or soften the binder, a curing oven can be provided, through which the material is passed after the deposition. The product can also be dried in this oven, if desired, to remove any remaining portion of the dispersing liquid. Alternatively, the binding agent can be caused to solidify by passing heated air or other heated gases through the product.

The microporous materials of the invention can be formed in any desired form or configuration, with or without a support. They can be set in the desired configuration by using a heat setting or curing binder and/or fibers and/or particulate material, which is cured after forming the material into the desired shape, so as to set it into that shape. Thus, for instance, the microporous sheet materials of the invention after laydown can be stripped from the support or left on the support, and then formed into a corrugated configuration, following which they can be put into the form of a filter element, as, for example, by folding the corrugated sheet into a cylindrical form, lapping over the free ends of the sheet, and bonding them, to complete the cylinder. This cylinder can be end capped, if desired, after which the binder present in the layer during or after formation can be set. The result is a rigid structure in which the microporous sheet material is quite resistant to deformation or distortion under rather high fluid pressures. The preceding is given merely as an example. It will be apparent that any desired configuration can be adopted.

If desired, the microporous materials of the invention can also be laminated to other materials. The binder present can serve as a bonding agent for binding the material to other components of the laminate.

The adhesion obtained between the fibers in the layers can be quite high, particularly when a binder or activatable fibers or particulate material is used. As a result, the strength of the final product is dependent primarily upon the strength of the fibers and binder. A convenient and meaningful method of measuring the adhesion developed in the final product is to form the product into a flat sheet having a surface area of 1/20 square foot, the fine layer, or the support, if there is one, being on the upper surface. The sheet is clamped in a device, which permits fluid to be held on the upper surface while the lower side is connected to a source of air pressure. The fluid which is in contact with the upper surface is one with which it is wetted, as for example, water or alcohol. Air is then gradually admitted to the lower side, a pressure gauge being employed to measure the buildup of pressure. Ultimately, the pressure exerted by the air becomes too great and causes the fine layer to rupture. This is easily observable by the increased bubbling of the liquid immersion medium. The maximum air pressure achieved before rupture is a measure of the adhesion. When the average pore diameter of the fine layer exceeds 0.3 micron, the differential pressure of the medium at the flow rate through the medium at rupture should be calculated, and this differential pressure subtracted from the total pressure at rupture to yield the actual pressure causing rupture. At pore diameters below 0.3 micron, the differential pressure can safely be disregarded.

The voids volume of the material is determined by measuring apparent volume and true volume. The apparent volume of the microporous material or layer is determined by measurement of the area and thickness of the material or layer. The true volume is determined by fluid displacement techniques using a fluid capable of wetting all of the components of the product. The voids volume is then determined by the following equation:

$$\text{Voids volume} = 100 \times \left[ 1 - \frac{\text{true volume of layer}}{\text{apparent volume of layer}} \right]$$

Calculated by this method, the microporous materials produced by means of this invention preferably have coarse layers with voids volumes of at least 75% and in some instances 90% and even higher.

The pore size or diameter of the microporous materials of this invention was evaluated by the following test which is substantially in accordance with the procedure of U.S. Patent No. 3,007,334.

A disc of the material to be tested is wetted with a fluid, preferably ethyl alcohol, capable of wetting the microporous layer, and clamped between rubber gaskets. A fine screen is positioned above the disc supporting it against upward movement. The volume above the disc is filled with the fluid. Air pressure is increased in the chamber below the disc until a stream of air bubbles is observed emerging from one point of the test piece. The effective pore diameter is then calculated by the well-known formula:

$$\text{pore diameter (microns)} = \frac{K}{\text{pressure (inches of water)}}$$

This formula is discussed in WADC Technical Report 56–249, dated May 1956, entitled "Development of Filters for 400° F. and 600° F. Aircraft Hydraulic Systems" by David B. Pall, and available from the ASTIA Document Service Center, Knott Building, Dayton, Ohio. A detailed description of the bubble point test and determination of pore size from the maximum particle passed will be found in Appendix I of this report. See also U.S. Patent No. 3,007,334, dated November 7, 1961, to David B. Pall.

K is determined by measuring the maximum spherical glass bead or carbonyl iron particle which passes through the element, in accordance with WADC Technical Report 26–249 and MIL–F–8815 (ASG) Paragraph 4.7.8 (March 18, 1960), or the largest bacteria which passes through.

The pore diameter obtained by this method is the maximum pore diameter. By continuing to increase air pressure until the whole surface of the filter medium is bubbling (known as the "open bubble point"), the same constant can be used to compute an average diameter characteristic of most of the pores. Tests have shown that if air is passed at a velocity of 70 to 170 cm./min., the pressure necessary to achieve the open bubble point taken together with the K value given above gives a value for the pore opening approximating the true average value. The ratio between the maximum pore size and the average pore size of the microporous media of this invention generally ranges from about 2:1 to about 4:1, a relatively small difference which greatly increases the safety and reliability of the product.

The following examples in the opinion of the inventors represent preferred embodiments of the invention.

*Example 1*

An aqueous fiber dispersion was prepared containing 5.4 g./l. of crocidolite type asbestos fibers having an average diameter of 0.5 micron and an average length of 300 microns and 0.6 g./l. of crocidolite fibers having an average diameter of 0.5 micron and an average length of 1500 microns, by agitation in a high shear mixer having a rotor diameter of 7 inches, at a speed of 1800 r.p.m.

An amyl acetate binder solution was prepared containing 4.75% by weight of neoprene, 0.2% by weight magnesium oxide and 0.24% by weight of zinc oxide, 0.05% by weight of tetraethylthiuram disulfide as a curing agent, 0.05% sodium dibutyl dithiocarbamate as a curing agent, 0.11% by weight of phenyl-$\beta$-naphthylamine as a stabilizer, and 94.7% by weight amyl acetate.

This was blended into the fiber slurry at the region of highest shear in a ratio of neoprene to fibers of 15:100. Neoprene was thereby deposited on the fibers, so that the fibers were coated with about 15% by weight neoprene.

A thin cellulose paper having a thickness of 0.0045 inch and a weight of 2.65 g./ft.$^2$ was placed on the foraminous belt of a Fourdrinier machine, and served as the foraminous base support for laydown of the microporous material. The paper was used as the base rather than the mesh to ensure a smooth surfaced fine base layer. The paper was stripped from the microporous material after it had been laid down, and before curing.

The dispersion of fibers and binding agent was then flowed upon the paper support, and the resulting turbulence deflocculated some fibers while some liquid drained out by gravity, thereby forming a thin first microporous layer of deflocculated fibers about 0.001 inch in thickness, of the mixed abestos fibers, in which the fibers lay almost entirely in planes approximately parallel to the plane of the layer, and having an average pore diameter of 0.1 micron, and a maximum pore diameter of 0.3 micron. The flow through the support slowed as the layer formed, and the fibers in the supernatant liquid refluocculated. The belt was passed under a doctor blade which broke up excessively large flocs in the supernatant dispersion. Thereafter, a vacuum of 15 inches of mercury was applied on the underside of the foraminous belt, causing the supernatant dispersion to flow through the thin layer, depositing the remaining mixed asbestos fibers on the thin layer, under pressure flow, and forming a coarse layer having an average pore diameter of 0.25 micron, a maximum pore diameter of 0.55 micron and a thickness of about 0.004 inch.

The bilayered sheet so formed had a thickness (uncompressed) of 0.006 inch, and was dried under infrared lamps, and then oven-cured for 20 minutes at 310° F. It had a water permeability of 10 gallons per minute per square foot at an applied pressure differential of 15 p.s.i. The voids volume of the relatively coarse layer was found to be about 84%, and for the thin layer, it was 60%.

FIGURE 1 is a view on a greatly magnified scale of a cross section through a very small portion of the microporous material produced in accordance with this example, showing a portion of the relatively fine thin layer 1, with the fibers thereof lying almost entirely in planes approximately parallel to the plane of the layer, the coarse layer 2, and the fibers 3 thereof extending outwardly at an angle to the thin layer of at least 30°. The resin binder 4 is lodged at the points of crossing of the fibers throughout the material, holding them in place.

FIGURE 1 shows that the outwardly extending fibers 3 are present throughout the coarse layer, and not only at the suprface.

Example 2

An aqueous fiber dispersion was prepared containing 5.4 g./l. of crocidolite type asbestos fibers having an average diameter of 0.5 micron and an average length of 300 microns and 0.6 g./l. of crocidolite fibers having an average diameter of 0.5 micron and an average length of 1500 microns, by agitation in a high shear mixer having a rotor diameter of 7 inches, at a speed of 1800 r.p.m.

An amyl acetate binder solution was prepared containing 4.75% by weight of neoprene, 0.2% by weight magnesium oxide and 0.24% by weight of zinc oxide, 0.05% by weight of tetraethylthiuram disulfide as a curing agent, 0.05% sodium dibutyl dithiocarbamate as a curing agent, 0.11% by weight of phenyl-$\beta$-naphthylamine as a stabilizer, and 94.7% by weight amyl acetate.

This was blended into the fiber slurry at the region of highest shear in a ratio of neoprene to fibers of 15:100. Neoprene was thereby deposited on the fibers, so that the fibers were coated with about 15% by weight neoprene.

A thin cellulose paper having a thickness of 0.0045 inch and a weight of 2.65 g./ft.$^2$ containing 15% by weight polyvinylidene chloride as binder, was placed on the foraminous belt of a Fourdrinier machine, and served as the foraminous base support for laydown of the microporous material, as well as the support thereafter, since the paper was not stripped off. The paper was used as the base rather than the mesh to ensure a smooth surfaced fine base layer.

The dispersion of fibers and binding agent was then flowed upon the paper support, and the resulting turbulence deflocculated some fibers, while some liquid drained out by gravity, thereby forming a thin first microporous layer of deflocculated fibers about 0.001 inch in thickness, of the mixed asbestos fibers, in which the fibers lay almost entirely in planes approximately parallel to the plane of the layer, and having an average pore diameter of 0.1 micron, and a maximum pore diameter of 0.3 micron. The flow through the support slowed as the layer formed, and the fibers in the supernatant liquid reflocculated. The belt was passed under a doctor blade which broke up excessively large flocs in the supernatant dispersion. Thereafter, a vacuum of 15 inches of mercury was applied on the underside of the foraminous belt, causing the supernatant dispersion to flow through the thin layer, depositing the remaining, mixed asbestos fibers on the thin layer, under pressure flow, and forming a coarse layer having an average pore diameter of 0.25 micron, a maximum pore diameter of 0.55 micron and a thickness of about 0.004 inch.

The bilayered sheet so formed had a thickness (uncompressed) of 0.005 inch (excluding the paper support), and was dried under infrared lamps, and then over-cured for 20 minutes at 310° F. The formed sheet adhered to the paper support at the conclusion of the cure. It had a water permeability of 10 gallons per minute per square foot at an applied pressure differential of 15 p.s.i. The voids volume of the relatively coarse layer was found to be about 84%, and for the thin layer, it was 60%.

Microscopic inspection of a cross-section of the bilayered material showed that the relatively coarse layer had a proportion of fibers extending outwardly from the thin layer at an angle of at least 30°, and that the fibers of the coarse layer were intermingled and interlocked with the thin layer fibers, in the interzone between the layers.

As a first control, the procedure of Example 1 was repeated with the exception that the flocculated dispersion was flowed upon the paper support, and within about 5 seconds thereafter, a vacuum of 15 inches of mercury was applied on the underside of the belt, with the result that substantially all the fibers including clumps were laid down under pressure-flow on the support. The material was then cured as before, to set the binder.

Microscopic inspection of a cross-section of the material showed that throughout all of the thickness a proportion of the fibers thereof were extending outwardly at an angle to the paper substrate of at least 30°, and that there was no fine layer present. Thus, deflocculation is required to form the fine layer.

The procedure was repeated, with the exception that a completely deflocculated dispersion was flowed upon the paper support, and the liquid drained off. Suction was applied to pull the fibers together, and the material was then cured to set the binder. A single layer was found to be present, by microscopic examination, having all fibers lying almost entirely in planes approximately parallel to the plane of the layer. Thus, flocculation of the dispersion is required to form the coarse layer.

Example 3

The procedure of Example 2 was repeated, using a 50% of weight aqueous neoprene latex. The ratio between the neoprene and curing and stabilizer additives remained the same.

The resulting product was a bilayered material comprised of a thin layer having a thickness of about 0.0005 inch, an average pore diameter of 0.1 micron, a maximum pore diameter of 0.3 micron, and a voids content of about 60%, and a coarse layer having a thickness of about 0.005 inch, an average pore diameter of about 0.3 micron, a maximum pore diameter of about 0.65 micron, and a voids content of about 81%, and a neoprene binder content on the fibers of 4% by weight. The product had a water permeability of 10 gallons per minute per square foot at a 15 p.s.i. applied differential pressure. Examination revealed that the thin layer had fibers lying almost entirely in planes approximately parallel to the plane of the layer, and that the fibers of the coarse layer were intermingled and interlocked with the fibers of the thin layer, and had a proportion of fibers extending outwardly from the thin layer at an angle of at least 30°.

Example 4

The procedure of Example 3 was repeated, and aluminum nitrate was added to the binder dispersion in an amount of about 350 mg./l. of solution, to increase neoprene precipitation upon the fibers, and to act as a flocculating agent for the fibers.

The resulting product was a bilayered material having a thickness (uncompressed) of 0.006 inch composed of a thin layer having fibers lying almost entirely in planes approximately parallel to the plane of the layer, having a thickness of about 0.0005 inch, an average pore diameter of 0.1 micron, and a maximum pore diameter of 0.3 micron, and a voids content of about 60%, and a coarse layer having a thickness of about 0.005 inch, an average pore diameter of about 0.3 micron, and a maximum pore diameter of about 0.65 micron, and a voids content of about 81%, and a neoprene binder content on the fibers of 15% by weight.

The product had a water permeability of 8 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

During deposition, the fibers in the coarse layer due to the flocculation, tend to cling to one another at their crossing points in the positions shown, the crossing points being spaced apart at relatively great distances. By flocculation, fibers normally tending to be flat are held together by the clinging action, and are also subjected to fluid flow through the base in a direction perpendicular thereto, so a substantial proportion can and do assume positions at an angle of 30° or more to the thin layer, in which positions they are permanently held in the final structure by the binder, thereby establishing the large voids volume characteristic of the coarse layer of the products of this invention. The pore diameter of the interstices of the coarse layer can nonetheless be of microscopic dimensions. However, in the thin layer the fibers are not angled towards the direction of fluid flow through the base, because they are deflocculated, and settle out in such a way as to be parallel to the plane of the layer, or nearly so.

After formation of the microporous layer, the paper support was removed from the Fourdrinier wire and corrugated to the form shown in FIGURE 2, and then the binder was cured to set the resin on the corrugations.

FIGURE 2 shows a portion of the resulting corrugated filter, including several of the pleats or corrugations, with portions partly broken away and shown in cross-section, showing the paper support 5, the fibers of the thin layer 1, and the fibers of the outer coarse layer 2. The cross-sectional portions are taken at the external and internal bends, as well as at the substantially straight portions between the bends.

*Example 5*

The procedure of Example 2 was repeated using as a binder dispersion a 4% methyl Cellosolve solution of melamine-formaldehyde resin. The quantity of binder used was such that the weight ratio of fiber to melamine-formaldehyde resin deposited thereon fiber/binder was 100:15.

The resulting product was a bilayered material having a thin layer having a thickness of about 0.0006 inch, an average pore diameter of 0.13 micron, a maximum pore diameter of 0.39 micron, and a voids content of about 70%, and a coarse layer having a thickness of about 0.006 inch, an average pore diameter of about 0.39 micron, and a maximum pore diameter of about 0.85 micron, and a voids content of about 85%, and a neoprene binder content on the fibers of 15% by weight. The product had a water permeability of 6 gallons per minute per square foot at a 15 p.s.i. applied differential pressure. Examination revealed that the thin layer had fibers lying almost entirely parallel to the plane of the layer, and that the fibers of the coarse layer were intermingled and interlocked with the fibers of the thin layer, and included a proportion of fibers extending outwardly from the thin layer at an angle of at least 30°.

*Example 6*

An aqueous fiber dispersion was prepared containing 6 g./l. of crocidolite type asbestos fibers having an average diameter of 0.2 micron and an average length of 300 microns.

A thin cellulose paper having a thickness of 0.004 inch and a weight of 2.5 g./ft.² was placed on the foraminous belt of a Fourdrinier machine, and served as the foraminous base support for laydown of the microporous material. The paper was used as the base rather than the mesh to ensure a smooth surfaced fine base layer. The paper was stripped from the microporous material after it had been laid down, and before curing.

The dispersion of fibers was then flowed upon the paper support, and the resulting turbulence deflocculated some fibers while some liquid drained out by gravity, thereby forming a thin first microporous layer of deflocculated fibers about 0.0004 inch in thickness, of the mixed asbestos fibers, in which the fibers lay almost entirely in planes approximately parallel to the plane of the layer, and having an averge pore size of 0.16 micron, and a maximum pore size of 0.35 micron. The flow through the support slowed as the layer formed, and the fibers in the supernatant liquid reflocculated. The belt was passed under a doctor blade which broke up excessively large flocs in the supernatant dispersion. Thereafter, a vacuum of 15 inches of mercury was applied on the underside of the foraminous belt, causing the supernatant dispersion to flow through the thin layer, depositing the remaining mixed asbestos fibers on the thin layer, under pressure flow, and forming a coarse layer having an average pore size of 0.25 micron, a maximum pore size of 0.6 micron, and a thickness of about 0.004 inch.

The bilayered sheet so formed had a thickness (uncompressed) of about 0.005 inch, and was dried under infrared lamps, and then oven-cured for 20 minutes at 310° F. It had a water permeability of 20 gallons per minute per square foot at an applied pressure differential of 15 p.s.i. The voids volume of the relatively coarse layer was found to be about 82.8%, and for the thin layer, it was 66.6%.

Microscopic inspection of a cross-section of the bilayered material showed the relatively coarse layer had a proportion of fibers extending outwardly from the thin layer at an angle of at least 30°, and that the fibers of the coarse layer were intermingled and interlocked with the thin layer fibers, in the interzone between the layers.

*Example 7*

The procedure of Example 6 was repeated except that th microporous material was not removed from the paper substrate, but was allowed to remain thereon for additional strength.

The resulting microporous layers on the paper had a thickness (uncompressed) of about 0.005 inch, composed of a thin layer having fibers lying almost entirely in planes approximately parallel to the plane of the layer, having a thickness of about 0.0004 inch, an average pore diameter of 0.16 micron, and a maximum pore diameter of 0.35 micron, and a voids content of 66%, and a coarse layer having a thickness of about 0.004 inch, an average pore diameter of about 0.25 micron, and a maximum pore diameter of about 0.6 micron, and a voids content of about 82.8%, and a neoprene binder content on the fibers of 15% by weight.

The product had a water permeability of 20 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

*Example 8*

The procedure of Example 6 was repeated except that a mixture of fibrous material was employed in the fiber dispersion, comprising 5.4 g./l. of crocidolite as in Example 6, and 0.6 g./l. of a coarse crocidolite having an average pore diameter of about 0.5 micron and an average length of 1500 microns.

The paper was stripped from the microporous material after it had been laid down, and before curing.

The resulting product was a bilayered material having a thickness (uncompressed) of 0.006 inch composed of a thin layer having fibers lying almost entirely in planes approximately parallel to the plane of the layer, having a thickness of about 0.0005 inch, an average pore diameter of 0.1 micron, and a maximum pore diameter of 0.3 micron, and a voids content of 60%, and a coarse layer having a thickness of about 0.005 inch, an average pore diameter of about 0.3 micron, and a maximum pore diameter of about 0.65 micron, and a voids content of about 81%, and a neoprene binder content on the fibers of 15% by weight.

The product had a water permeability of 17 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

*Example 9*

The procedure of Example 6 was repeated with the exception that the aqueous fiber dispersion contained 4.5 g./l. of crocidolite fibers having an average pore diameter of 0.2 micron, and an average length of 300 microns, and 1.5 g./l. of glass fibers having an average pore diameter of 3 microns, and an average length of 3 mm. The microporous product was not stripped from the paper substrate, but the paper was allowed to remain, for reinforcement.

The resulting microporous layers had a thickness (uncompressed) of 0.028 inch, composed of a thin layer having fibers lying almost entirely in planes parallel to the plane of the layer, having a thickness of about 0.0015 inch, an average pore diameter of 1.3 microns, and a maximum pore diameter of 3.9 microns, and a voids content of 87%, and a coarse layer having a thickness of about 0.027 inch, an average pore diameter of about 3.3 microns, and a maximum pore diameter of about 8 microns, and a voids content of about 95.3%, and a neoprene binder content on the fibers of 15% by weight.

The product had a water permeability of 23 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

*Example 10*

The procedure of Example 6 was repeated, with the exception that the aqueous fiber dispersion contained 5.4 g./l. of crocidolite asbestos having an average pore diameter of 0.2 micron and an average length of 300 microns, and 0.6 g./l. of polyester fibers (Dacron) having an average pore diameter of 12 microns and an average length of 6 mm. The microporous product was not removed from the paper substrate.

The resulting microporous layers had a thickness (uncompressed) of 0.014 inch, composed of a thin layer having fibers lying almost entirely in planes approximately parallel to the plane of the layer, having a thickness of about 0.003 inch, an average pore diameter of 0.3 micron, and a maximum pore diameter of 1.8 microns, and a voids content of 81%, and a coarse layer having a thickness of about 0.011 inch, an average pore diameter of about 1.2 microns, and a maximum pore diameter of about 4 microns, and a voids content of about 92%, and a neoprene binder content on the fibers of 15% by weight.

The product had a water permeability of 21 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

*Example 11*

The procedure of Example 10 was repeated, with the exception that polyamide (Nylon 6) fibers were used in place of the polyester fibers.

The resulting microporous layers had a thickness (uncompressed) of 0.012 inch composed of a thin layer having fibers lying almost entirely in planes approximately parallel to the plane of the layer, having a thickness of about 0.0025 inch, an average pore diameter of 0.2 micron, and a maximum pore diameter of 1.5 microns, and a voids content of 78%, and a coarse layer having a thickness of about 0.010 inch, an average pore diameter of about 1 micron, and a maximum pore diameter of about 3 microns, and a voids content of about 90%, and a neoprene binder content on the fibers of 15% by weight.

The product had a water permeability of 17 gallons per minute per square foot at a 15 p.s.i. applied differential pressure. Examination revealed that the coarse layer contained a proportion of fibers extending outwardly from the thin layer at an angle of at least 30°, and that the fibers of the coarse layer were intermingled and interlocked with the fibers of the thin layer.

The microporous materials of Examples 1 to 5 and 8 were used as filters to separate *Serratia marsescens* from an aqueous suspension thereof containing $10^{11}$ organisms/100 ml. of test liquid. The average removal based on influent was as follows:

| Example No.: | *Serratia marsescens* removal |
|---|---|
| 1 | $10^{11}$ |
| 2 | $10^{11}$ |
| 3 | $10^{11}$ |
| 4 | $10^{11}$ |
| 5 | $10^{6}$ |
| 8 | $10^{11}$ |

The microporous filter materials of this invention are, of course, useful as filter materials for the removal of suspended solids from fluids as well as for the removal of bacteria and other microorganisms. Where the multilayer filter material is employed for the removal of bacteria and other microorganisms, the filter material used should preferably comprise crocidolite asbestos about 98% of which has a fiber length of less than 500 microns. The microporous materials are also useful as semipermeable membranes for gases and liquids. They can be used for the oxygenation of blood and for dialysis membranes and in closed cycle ecological systems, among a great variety of possible applications.

Having regard to the foregoing disclosure, the following is claimed as the inventive and patentable embodiments thereof:

1. A process for preparing microporous integrated multilayer fluid-permeable material from a single dispersion of fibrous material in a dispersing liquid, which comprises flowing upon a foraminous support a dispersion in a dispersing liquid of fibrous material comprising at least 25% fibrous material, forming a plurality of flocculated clumped masses of deflocculated fibers together with a proportion of separate fibers in the dispersion, forming on the foraminous support a thin first microporous layer having fibers lying almost entirely in planes approximately parallel to the plane of the layer, and having a maximum pore diameter of less than 25 microns, by flow through the support of not over 20% of the dispersing liquid at a pressure differential of less than 12 inches of water, depositing the fibers upon the support to form the thin layer, and then flowing the remaining supernatant liquid of the dispersion through the thin layer, and depositing the remaining flocculated fibrous material of the dispersion including the clumps on the thin layer, to form thereon a fluid-permeable layer wherein a proportion of fibers extend in a direction outwardly from the thin layer at an angle greater than about 30°, sufficient to impart to the layer an average pore diameter of less than 150 microns and a voids volume of at least 75%.

2. A process as in claim 1 which comprises flocculating the fibrous material in the dispersion by addition of a flocculating agent.

3. A process as in claim 1 which comprises partially deflocculating a flocculated dispersion to form the proportion of separate fibers in the dispersion.

4. A process as in claim 3 which comprises subjecting the dispersion to turbulent flow to defloccuiate the fibers for deposition of the thin layer and then allowing the dispersion to remain quiescent to permit reflucculation for deposition of the coarse layer.

5. A process as in claim 1 which comprises stripping the microporous fluid-permeable material from the foraminous support.

6. A process as in claim 1 wherein the foraminous support comprises a heat-sealable paper and including in addition heating the composite of microporous fluid-permeable material and paper to bond the same together.

7. A process as in claim 1 wherein the thin layer is formed by gravity flow through the support.

8. A process as in claim 1 wherein the fibrous material employed has an average fiber diameter of less than about 25 microns, and an average fiber length of between 50 and 5000 microns.

9. A process as in claim 1 wherein the fibrous material is potassium titanate.

10. A process as in claim 1 wherein the fibrous material is asbestos.

11. A process as in claim 1 wherein the fibrous material is glass.

12. A process as in claim 1 wherein the fibrous material is quartz.

13. A process as in claim 1 wherein the dispersion in a dispersing liquid of fibrous material includes a binding agent.

14. A process as in claim 13 wherein the binding agent is an elastomeric material.

15. A process as in claim 14 wherein the binding agent is neoprene.

16. A process as in claim 14 wherein a precipitating agent for the binder is added, to precipitate the elastomer on the fibrous material.

17. A process as in claim 1 wherein the fibrous material comprises a mixture from about 0.5 to about 30% by weight of fibrous material at least as long as the average pore size of the foraminous support, and from about 95.5 to about 70% by weight of short fibers, the long fibers having a diameter of about ten times the diameter of the short fibers.

18. A microporous fluid-permeable material of the integrated multilayer fibrous structure obtained by laydown upon a foraminous support from a single dispersion of fibrous material in a dispersing liquid, and capable of removing ultrafine particles from fluids and comprising at least 25% fibrous material, containing a fine layer having a maximum pore diameter below about 25 microns and a thickness within the range from about 0.0001 to about 0.05 inch, and having a major proportion of fibers lying almost entirely in planes approximately parallel to the plane of the layer, and juxtaposed thereto a coarser layer having an average pore diameter below about 150 microns, and having a major proportion of fibers extending outwardly from the fine layer at an angle greater than 30° and a voids volume of at least 75%, the fibers in each layer and at the interface of the coarse layer and fine layer being intermingled and interlocked with each other.

19. A microporous fluid-permeable material as in claim 18 wherein the fibers in each layer and at the interface of the coarse layer and fine layer are bonded together by a binding agent homogeneously distributed throughout each layer.

20. A microporous fluid-permeable material as in claim 18, wherein each of said layers has an average pore diameter of less than 25 microns.

21. A microporous fluid-permeable material as in claim 18, wherein the fibrous material of each layer comprises asbestos fibers.

22. A microporous fluid-permeable material as in claim 18, bonded to a foraminous support.

23. A microporous fluid-permeable material as in claim 18, wherein the fibrous material comprises quartz.

24. A microporous fluid-permeable material as in claim 18, wherein the fibrous material comprises potassium titanate fibers.

25. A microporous fluid-permeable material as in claim 18, wherein the fibrous material comprises glass fibers.

26. A filter element comprising, in combination, a microporous fluid-permeable material as in claim 18 formed in a cylinder having two open ends and an end cap closing off each of the open ends.

27. A corrugated filter element comprising a microporous fluid-permeable material as in claim 18, in corrugated form.

References Cited
UNITED STATES PATENTS

| | | |
|---|---|---|
| 2,217,005 | 10/1940 | Clapp. |
| 2,834,730 | 5/1958 | Painter et al. _____ 210—505 X |
| 2,999,786 | 9/1961 | Downs et al. _____ 162—129 |
| 3,246,767 | 4/1966 | Pall et al. _____ 210—505 |

REUBEN FRIEDMAN, *Primary Examiner.*

F. W. MEDLEY, *Assistant Examiner.*

UNITED STATES PATENT OFFICE
CERTIFICATE OF CORRECTION

Patent No. 3,353,682                            November 21, 1967

David B. Pall et al.

It is hereby certified that error appears in the above numbered pat ent requiring correction and that the said Letters Patent should read as corrected below.

Column 4, line 3, for "supernatent" read -- supernatant --; column 5, line 40, for "unformity" read -- uniformity --; line 52, for "diameter/length" read -- length/diameter --; column 6, line 44, for "ben" read -- been --; lines 20 and 21, for "advtanges" read -- advantages --; line 57, for "materals" read -- materials --; lines 70 and 71, for "polytrifluorochlorochloroethylene" read -- polytrifluorochloroethylene --; column 7, line 18, for "polyethylene, glycol" read -- polyethylene glycols --; column 7, line 40, for "mechanicaly" read -- mechanically --; column 8, line 49, for "materials" read -- material --; column 10, line 51, for "product" read -- products --; line 63, for "butadinene" read -- butadiene --; column 11, line 1, for "centipoises" read -- centipoise --; line 17, for "of" read -- the --; line 43, for "that" read -- than --; line 62, for "500 cps." read -- 500 cp. --; column 12, line 16, for "elestomeric" read -- elastomeric --; column 13, line 59, for "formaminous" read -- foraminous --; column 15, line 20, for "floculation" read -- flocculation --; line 37, for "mutilayered" read -- multilayered --; column 17, line 54, for "Dayton, Ohio" read -- Dayton 2, Ohio --; column 20, line 18, for "50% of weight" read -- 50% by weight --; column 22, line 13, for "showed the" read -- showed that the --; line 21, for "th" read -- the --; column 24, line 63, for "reflucculation" read -- refloccu: tion --; column 25, line 33, for "containing" read -- compris: ing --.

Signed and sealed this 25th day of March 1969.

(SEAL)
Attest:

EDWARD M. FLETCHER, JR.                        EDWARD J. BRENNER
Attesting Officer                                Commissioner of Patents